United States Patent [19]

Kamo et al.

[11] 3,870,755
[45] Mar. 11, 1975

[54] METHOD FOR MANUFACTURING NITROGEN-CONTAINING COMPOUNDS

[75] Inventors: Seiichi Kamo, Tokyo; Noriyoshi Yanai; Naoto Osako, both of Kitakyushu, all of Japan

[73] Assignee: Mitsubishi Chemical Industries Limited, Tokyo, Japan

[22] Filed: Feb. 16, 1972

[21] Appl. No.: 226,957

Related U.S. Application Data

[63] Continuation of Ser. No. 864,273, Sept. 29, 1969, which is a continuation of Ser. No. 731,665, Jan. 24, 1968, abandoned, Continuation of Ser. No. 637,609, May 10, 1967, abandoned, Continuation of Ser. No. 451,538, May 28, 1965, abandoned.

[52] U.S. Cl. .................................... 260/553 R
[51] Int. Cl. .................................... C07c 127/12
[58] Field of Search .......................... 260/553 R

[56] References Cited
FOREIGN PATENTS OR APPLICATIONS
949,408   2/1964   Great Britain
629,255   10/1963  Belgium Primary Examiner—Leon Zitver
Assistant Examiner—Michael W. Glynn
Attorney, Agent, or Firm—Bierman & Bierman

[57] ABSTRACT

The invention is directed to the making of solid alkylidene diurea and conducting the reaction between urea and an aldehyde by controlling the ratio of aldehyde to urea fed to a reactor so as to balance the heat evolved in the reaction between the aldehyde and urea with the latent heat of evaporation of excess of aldehyde, whereby the temperature of the reaction is maintained within predetermined limits. The product is of high purity and the yield is high.

10 Claims, 1 Drawing Figure

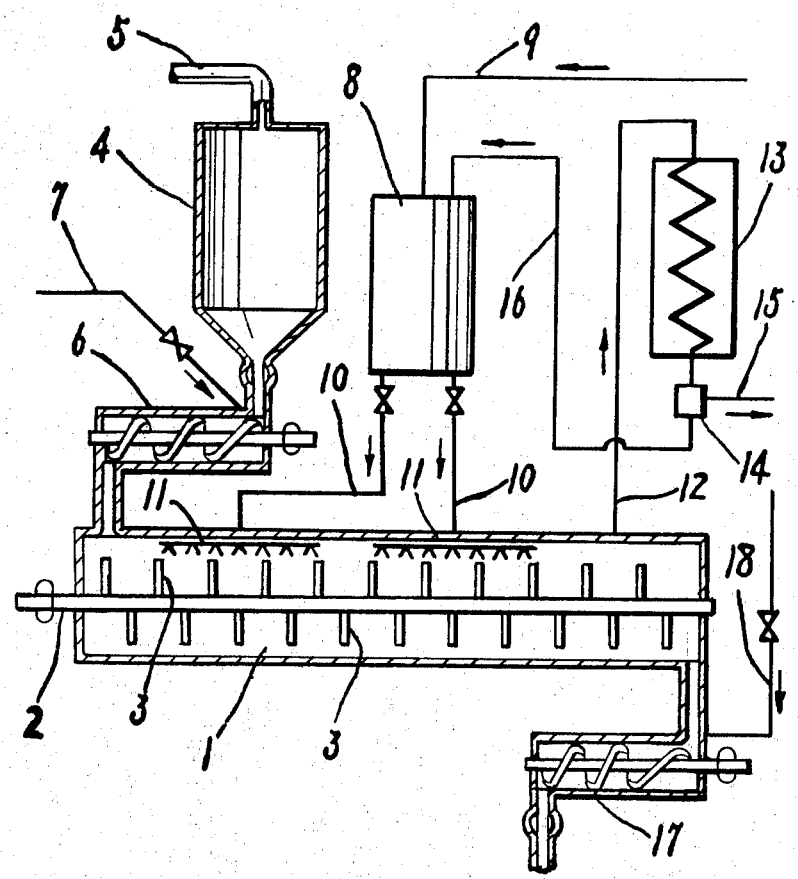

METHOD FOR MANUFACTURING NITROGEN-CONTAINING COMPOUNDS

This application is a continuation of Ser. No. 864,273, filed Sept. 29, 1969, which is a streamlined continuation of Ser. No. 731,665, filed Jan. 24, 1968, now abandoned, which in turn is a continuation of Ser. No. 637,609, filed May 10, 1967, now abandoned, which in turn is a continuation of Ser. No. 451,538, filed May 28, 1965, now abandoned.

The invention relates to a method of manufacturing nitrogen-containing compounds, and in particular to improvements in or relating to the method of manufacturing a nitrogen-containing compound, more especially of an alkylidene diurea in which an aliphatic saturated aldehyde having 3 to 4 carbon atoms such as isobutylaldehyde, n-butylaldehyde, and propionaldehyde is condensed with urea.

A method has been known for the manufacture of an alkylidene diurea in which 1 mol of an aldehyde such as isobutylaldehyde is added under vigorous stirring to an aqueous urea solution containing 2 mol of urea or more and condensed in liquid phase. The precipitate produced is filtered and is then dried to obtain an alkylidene diurea as condensed product such as isobutylidene diurea. Also it has been known that the thus obtained product is employed as a gradually available fertilizer invaluable for promoting the growth of plants. Reference will be made to as for example British Pat. No. 949,408 and German Pat. (DAS) No. 1,146,080.

According to the above mentioned liquid phase process, however, the condensed product is precipitated in minute solids having a particle size in the range of 7 to 250 micron, or more or less so that technical difficulties are encountered in effecting separation by filtration of the precipitate. In addition, such process is not economical because an apparatus of large scale is required for the separation of the precipitate and subsequent drying thereof.

By spraying an aliphatic saturated aldehyde having 3 to 4 carbon atoms onto solid urea at room temperatures an alkylidene diurea may possibly be obtained. However, such process is not practicable to obtain a pure product in that a considerable amount of urea remains unreacted or by-products are produced owing to the unfavorable reaction. For example, if 1 mol of aldehyde and 2 mol of urea, the ratio being theoretical, are employed a considerable amount of urea will remain unreacted, rendering it impossible to obtain an alkylidene diurea with a high yield.

On the other hand, the employment of the aldehyde in excess of the theoretical amount for the purpose of preventing urea from remaining unreacted results in formation of unfavorable by-products. For example, if an excess of isobutylaldehyde is employed at room temperature, a considerable amount of by-products including isobutylidene monourea (24.6% N), diisobutylidene triurea (29.2% N), and diisobutylidene diurea (24.6% N) which are lower in nitrogen content than isobutylidene diurea and inferior to isobutylidene diurea as a gradually available fertilizer are caused to form in company with the desired isobutylidene diurea (32.2% N).

In order to solve these problems we have made extensive researches whereby a process for manufacturing an alkylidene diurea from an aldehyde having preferably 3 to 4 carbon atoms with urea has been developed. We have discovered that if solid urea and the aldehyde are caused to directly react in a specific range of temperatures without employment of a solvent such as water or organic solvent, a pure alkylidene diurea is obtained economically at a high yield without allowing urea to remain unreacted and by-products to form.

We have discovered further that the employment of the aldehyde in excess of the theoretical amount, namely, more than 0.5 mol of aldehyde per 1 mol of urea, said excess amount being within a specific range, affords great advantages from an economical viewpoint for the purpose of maintaining reaction temperatures in the said specific range. We have confirmed furthermore that maintenance of reaction temperatures in the above-mentioned range is accomplished by suitably selecting the ratios of urea to aldehyde which have been maintained at an appropriate temperature prior to the feed without the necessity of heating or cooling the reactor from exterior.

It is an object of the invention to provide a method for manufacturing advantageously and economically an alkylidene diurea from an aliphatic saturated aldehyde having 3 to 4 carbon atoms and urea. Another object of the invention is to provide a continuous process for manufacturing said alkylidene diurea. The first object is accomplished by a method comprising subjecting solid urea and an aliphatic saturated aldehyde having 3 to 4 carbon atoms to reaction in the presence of an acid under stirring in a reactor, which is closed in a non-gas-tight manner and carrying out the reaction in said reactor at a temperature, which is up to 20° C. higher than the temperature at which the aldehyde is allowed to boil. The second object is accomplished by a method comprising continuously introducing solid urea and an aliphatic saturated aldehyde having 3 to 4 carbon atoms in the ratio of 1 mol to 0.6 – 1.1 mol into a reactor, which is closed in a non-gas-tight manner for effecting reaction under stirring in the presence of an acid; keeping the reaction temperature up to 20° C. higher than a temperature at which the aldehyde is allowed to boil in the reactor; continuously discharging the reaction product obtained by said reaction from the reactor; and condensing unreacted aldehyde vapour for further circulation.

The invention is based upon the concept and the determination that it is feasible to control the temperature of the reaction between urea and aldehyde in the substantial absence of solvents, by balancing the exothermic heat evolved with the latent heat of evaporation of aldehyde. This idea is new and is not found in the prior art.

In order to obtain this control certain conditions of operation must be set. (1) The temperature must be above the boiling point of the aldehyde but not higher than about 20° above the boiling point. (2) The ratio of urea to aldehyde must be within the limits of 1 mol of urea to 0.6 – 1.1 mol of aldehyde. (3) Provision must be made for the escape of vapors of aldehyde. (4) The pH of the reaction must be below about 6.

The control is simple and accurate. The urea may be fed into the reactor continuously and the aldehyde feed may be varied by manipulation of the feed valve to maintain the proper range of temperature. The heat of reaction and latent heat of evaporation of several aldehydes are listed below.

Table A

Heat of Reaction and Latent Heat of
Evaporation of Various Aldehydes with Urea

| Aldehyde | Heat of Reaction | Latent Heat of Evaporation |
|---|---|---|
| iso-butyraldehyde | 21 Kcal/mol | −7.2 Kcal/mol |
| propionaldehyde | 19 Kcal/mol | −6.9 Kcal/mol |
| n-butyraldehyde | 16 Kcal/mol | −7.5 Kcal/mol |

These values show that the positive and negative heats may easily balance each other to maintain the temperature range which is necessary to give high efficiency.

In addition to the purity of the product and the high yield, there is the very important economic factor of a continuous process, practically automatic, with large production per unit apparatus.

In the method according to the invention isobutylidene diurea is formed from urea and isobutylaldehyde, n-butylidene diurea from urea and n-butylaldehyde, and propylidene diurea from urea and propionaldehyde, respectively.

The urea employed in the method according to the invention may generally take form of granules having a particle size of 5 to 20 mesh, or more or less or powder having a particle size of 30 to 80 mesh, or more or less which may be of fertilizer quality, containing a certain amount of inert impurities. The urea may be diverse in form and size.

The aldehyde employed in the present invention includes isobutylaldehyde, n-butyaldehyde, and propionaldehyde of common grades which may contain a certain amount of inert impurities. Preferably, the urea and aldehyde are maintained at an appropriate temperature before they are fed to a reactor.

The condensation reaction of urea and the aldehyde is carried out in a reactor, which is closed in a non-gas-tight manner. Neither an open vessel nor a gas-tight autoclave is serviceable as the reactor. The reactor employed in the method according to the invention comprises a vessel, which is adapted to keep gaseous matter therein while being provided with an inlet each for urea and the aldehyde, an outlet for the reaction product and an outlet for aldehyde vapor which is connected to a condenser for collecting unreacted aldehyde vapor and the accompanying water produced in the reaction between urea and the aldehyde. A preferred apparatus employed for continuously performing the method according to the invention will be illustrated in greater detail in the latter part of this specification by reference to the attached drawing.

Urea and the aldehyde are fed to the reactor in the ratio of 1 mol of urea to more than 0.5 mol of the aldehyde, namely, the aldehyde is employed in excess of the theoretical amount. As will be described, it is especially necessary to feed at the rate of 0.6 to 1.1 mol of the aldehyde per 1 mol of urea in order that the reaction temperature be maintained in a suitable range, whereby a pure alkylidene diurea is manufactured with important advantages.

In the method according to the invention, the reaction of urea and the aldehyde may be effectively carried out in a specific range of reaction temperatures, namely, from a temperature at which the aldehyde is allowed to boil in the reactor to a temperature which is about 20°C higher than the said boiling temperature.

In the method according to the invention, condensationn of 2 mol of urea and 1 mol of the aldehyde results in producing 1 mol of alkylidene diurea and 1 mol of water, a portion of the water being accompanied by aldehyde vapor arising from the excess of aldehyde employed.

The aforesaid temperature at which the aldehyde is allowed to boil in the reactor does not imply the boiling temperature of the sole aldehyde itself, but indicates the azeotropic temperature of the aldehyde and the water produced by the reaction. It will be understood that the boiling point of iosubylaldehyde itself, as for example, under atmospheric pressure, is about 64°C while its boiling temperature in the reactor according to the invention is about 59°C. In one embodiment the temperature is maintained from about 63° to 75°C.

In order to maintain reaction temperatures in the above mentioned range it is especially important to select a suitable ratio in which urea and aldehyde are fed to a reactor, said ratio being 1 mol urea to 0.6 – 1.1 mol aldehyde. The urea and aldehyde to be fed to the reactor are maintained at an appropriate temperature prior to the feed while controlling the ratio of urea to aldehyde for feed so that the temperature is automatically kept within the above mentioned range by virtue of the favorable balance between the sensible heat gained from the condensation reaction and the latent heat lost by the evaporation of excess aldehyde.

If the reaction is carried out at a temperature above the aforementioned range, the amount of unreacted urea increases, resulting in a lower yield of the reaction product. Inversely, the reaction carried out at a temperature below the said range gives rise to formation of by-products low in nitrogen content, rendering it difficult to obtain the desired pure reaction product. Giving a case as for example where urea was fed at the rate of 708 Kg/hr, isobutylaldehyde at the rate of 600 Kg/hr, and 40% sulphuric acid at the rate of 4.6 Kg/hr to a reaction, which was maintained at various temperatures, Table 1 gives the rate of reaction of urea and the nitrogen content of the reaction product.

Table 1

| Reaction temperature (°C) | Rate of reaction of urea (weight %) | Nitrogen content of reaction product (weight %) |
|---|---|---|
| 52 – 56 | 98.7 | 27.00 |
| 56 – 58 | 98.6 | 28.63 |
| 59 – 64 | 98.4 | 30.92 |
| 64 – 68 | 98.4 | 31.46 |
| 68 – 72 | 98.0 | 31.84 |
| 72 – 76 | 97.6 | 32.05 |
| 76 – 80 | 95.4 | 32.17 |
| 80 – 84 | 90.3 | 32.17 |
| 84 – 88 | 79.0 | 32.18 |
| 88 – 92 | 64.0 | 32.18 |
| 92 – 96 | 35.0 | 32.18 |

Remarks:
Nitrogen content of reaction product $$= \frac{(TN-UN) \times 100}{100 - \frac{UN}{46.65} \times 100 - W} \quad (\%)$$

TN: Percent by weight of total nitrogen contained in reaction product.
UN: Percent by weight of nitrogen in the form of urea contained in reaction product.
W: Percent by weight of water contained in reaction product.
46.65: Percent by weight of nitrogen contained in urea.

It will be seen from Table 1 that if the reaction temperature is too low (below about 58°C) the rate of reaction of urea remains fair while the nitrogen content of reaction product becomes remarkably lower than that of isobutylidene diurea, about 27 – 28%. When the proper temperatures are employed, the nitrogen content is over 32%.

If the reaction temperature is too high (above about 84°C) the nitrogen content of the reaction product approximates that of isobutylidene diurea while the rate of reaction of urea drops considerably even to a point as low as 35%. Similar tendencies were exhibited with n-butylaldehyde and propionaldehyde.

Addition of an acid as catalyst is necessary for accomplishing the reaction of urea and the aldehyde. Inorganic acids including sulphuric acid, hydrochloric acid and phosphoric acid are economically used but organic acids including formic acid, acetic acid, monochloroacetic acid, oxalic acid, citric acid, tartaric acid, benzenesulphonic acid and toluensulphonic acid may serve the same purpose. These acids are employed as a 30 to 50% aqueous solution so that the acids come in contact evenly with the starting compounds. The acids may be added beforehand to starting urea or aldehyde or otherwise they may be added to a mixture of starting urea and aldehyde in a reactor. The amount of an acid to be added is such that the pH of supernatant liquid is maintained below 6, preferably from 1 to 4.5, said pH of supernatant liquid being obtained by adding 10 parts by weight of reaction product (solid) to 100 parts of water. For the sake of convenience, the said supernatant liquid will hereinafter be referred to as "pH of reaction product."

Based on experiments, the amount of each of the acids to be added may be determined individually, depending on the amount of urea and aldehyde to be employed. Table 2 shows the correlation between the pH of reaction products for a variety of acids and the amount of acids added when 1 mol of urea containing 0.03% of ammonia and 0.7 mol of isobutylaldehyde containing 0.2% of isobutylic acid are employed.

Table 2

| Acid | 34% HCl | 40% H$_2$SO$_4$ | 50% CH$_3$COOH |
|---|---|---|---|
| Addition of acid in cc/Kg urea | pH | pH | pH |
| 1 | 8.2 | 8.2 | — |
| 2 | 4.2 | 4.2 | 6.0 |
| 3 | 3.4 | 3.4 | 5.3 |
| 5 | 3.0 | 3.0 | 4.8 |
| 10 | 2.6 | 2.6 | 4.4 |
| 15 | 2.3 | 2.3 | 4.2 |
| 20 | 2.0 | 2.0 | 4.1 |
| 25 | 1.8 | 1.8 | 4.0 |
| 30 | — | — | 3.9 |

Addition of so small an amount of acid or failure in adding the same that the pH of reaction product exceeds 6 results in a considerable decrease in the rate of reaction of urea. Table 3 shows the correlation between the rate of reaction of urea and the pH of reaction product when urea and isobutylaldehyde were fed in the ratio of 1 mol to 0.7 mol to a reactor for causing reaction at about 65°C.

Table 3

| pH | Rate of reaction of urea (%) | pH | Rate of reaction of urea (%) |
|---|---|---|---|
| 1 | 90.0 | 6 | 80.0 |
| 2 | 96.0 | 7 | 71.6 |
| 3 | 98.0 | 8 | 62.0 |
| 4 | 94.0 | 9 | 52.5 |
| 5 | 87.0 | | |

Remarks:

$$\text{Rate of reaction of urea } (\%) = \frac{TN - UN}{TN} \times 100 \ (\%)$$

TN: Percent by weight of total nitrogen contained in reaction product.
UN: Nitrogen in the form of urea in percent by weight.

As has been mentioned, in the method according to the invention, aldehyde is employed in excess of the theoretical amount, and the condensation reaction is effected at a temperature which is higher than the temperature at which the aldehyde is allowed to boil, thus advantageously ensuring recovery of the aldehyde evaporated in the reaction for which there are provided a suitable condenser for collecting the aldehyde vapor and a circulating means.

In effecting condensation reaction in the method according to the invention it is advantageous to maintain solid urea and liquid or gaseous aldehyde in good contact and to perform the reaction under stirring so as to keep the temperature as constant as possible in the reactor. If it is found necessary, the condensation product manufactured by the method according to the invention may be neutralized by the addition of a small amount of alkaline materials including sodium hydroxide, sodium carbonate, and ammonia.

The accompanying drawing illustrates diagrammatically an apparatus for use in continuously performing the method according to the present invention.

Reference character 1 designates a paddle mixer type reactor, 2 a shaft driven by an electric motor (not shown), 3 paddles threaded in the shaft 2 and twisted at a suitable angle which may be in the range of 15° to 30°, 4 a reservoir for urea, 5 a supply pipe for urea, 6 a quantitative feeder for urea, 7 an inlet pipe for acid, 8 a reservoir for aldehyde, 9 a supply pipe for aldehyde, 10 quantitative inlet pipes for aldehyde which lead to the reactor, 11 aldehyde sprays having a plurality of nozzles, 12 an outlet pipe for aldehyde vapor, 13 a condenser for aldehyde vapor, 14 a separator for separating water from aldehyde, 15 an outlet pipe for water, 16 a circulating pipe for aldehyde, 17 a quantitative discharger for reaction product, and 18 a supply pipe for alkali.

The reactor 1 may be somewhat inclined so as to dispose the outlet opening for reaction product at a lower level. Preferably there are provided two revolving shafts 2 in parallel in the reactor. The inlet pipe 7 for acids may be connected directly with the reactor.

Along with an acid fed from the inlet pipe 7, solid urea is continuously fed into reactor 1 via feeder 6 from reservoir 4. Aldehyde is fed into reactor 1 through nozzles of sprays 11 via inlet pipes 10 from reservoir 8. Revolving shafts 2 in the reactor are adapted to rotate at a speed, as for example, of 40 revolutions per minute.

The reaction product may be neutralized, if necessary, by alkali fed from pipe 18 before it is continuously discharged from discharger 17. Aldehyde vapor and a portion of produced water reach condenser 13 via outlet pipe 12 to be condensed therein. After being deprived of water in separator 14, the aldehyde is fed to aldehyde reservoir 8 via circulating pipe 16. The migration velocity of the reaction mixture within reactor 1 is controlled by regulating the revolution velocity of shaft 2 and by adjusting the inclination angle of blades of the paddle.

According to the method of the invention, an invaluable pure urea-aldehyde condensation product is manufactured advantageously and economically by the use of a comparatively simple apparatus.

The invention will be described in detail by way of preferred embodiment. Obviously modifications and alterations will occur to others upon a reading and understanding of this specification, and it is our intention to include all such modifications and alterations insofar as they come within the scope of the appended claims.

EXAMPLE 1

An apparatus as diagrammatically shown in the attached drawing was employed. Urea in granule form, about 90% of which has a particle size passing a screen of 8 to 14 mesh and which had been preheated at 70°C, was continuously fed from reservoir 4 at the rate of 708 Kg/hr to reactor 1, which is 4,500 mm in length, 700 mm in width and 640 mm in height and which is provided with two shafts arranged in parallel and having paddles. 33% $H_2SO_4$ was continuously fed from acid inlet pipe 7 at the rate of 6 Kg/hr to reactor 1. Also, isobutylaldehyde containing 0.2% isobutylic acid and 2.1% water and having the boiling point of 64°C which had been maintained at 10°C was fed from reservoir 8 at the rate of 600 Kg/hr via nozzles of aldehyde sprays 11 to reactor 1. The molar ratio of aldehyde to urea was approximately 0.7. The reaction mixture remained in the reactor for about 20 minutes while revolving shafts 2 were driven at the rate of 40 revolutions per minute. The temperature inside the reactor was held automatically in the range of 68° to 73°C. Ammonia gas was fed at the rate of 1 Kg/hr via alkali inlet 18 to the reactor. Reaction product in granule form was continuously discharged from discharger 17 at the rate of 1,080 Kg/hr. Unreacted isobutylaldehyde was collected in condenser 13 at the rate of 190 Kg/hr and returned to reservoir 8. The thus obtained reaction product contained approximately 7.5% by weight of water and 1.5% by weight of unreacted urea. The dried reaction product contained 31.9% by weight of nitrogen (refer to the formula in Table 1). When refined by water, this product had a melting point of 205.0° to 206.0°C (uncor.) and the analytical values closely approximated the calculated values of isobutylidene diurea as follows:

|  | C (%) | H (%) | N (%) |
|---|---|---|---|
| Calcd. for $C_6H_{14}O_2N_4$ | 41.4 | 8.1 | 32.2 |
| Analysis found | 41.2 | 7.9 | 32.1 |

Similar results were obtained when 35% HCl was fed at the rate of 5.8 Kg/hr or 50% acetic acid at the rate of 35 Kg/hr, in place of 33% $H_2SO_4$ employed at the rate of 6 Kg/hr in this Example.

EXAMPLE 2

The same method as in Example 1 was followed, employing the same apparatus. Urea at 20°C, 34% HCl, and isobutylaldehyde at 25°C were continuously fed to the reactor at the rate of 1,000 Kg/hr, 6 Kg/hr, and 1,000 Kg/hr, respectively. The molar ratio of aldehyde to urea was approximately 0.8. The temperature inside the reactor was kept automatically in the range of 63° to 68°C. Thus, reaction product of a grade similar to that in Example 1 was discharged at the rate of 1,500 Kg/hr. Unreacted isobutylaldehyde was recovered at the rate of 419 Kg/hr. The same results were obtained when 40% $H_2SO_4$ was fed at the rate of 6.5 Kg/hr or 50% acetic acid at the rate of 35 Kg/hr, in place of 34% HCl employed in this Example at the rate of 6 Kg/hr.

EXAMPLE 3

The same method as in Example 1 was followed, employing the same apparatus. Urea at 80°C, 40% $H_2SO_4$, and isobutylaldehyde at 25°C were fed to the reactor at the rate of 1,000 Kg/hr, 6.5 Kg/hr and 1,200 Kg/hr, respectively. The molar ratio of aldehyde to urea was about 1.0 The temperature inside the reactor was kept automatically in the range of 63° to 68°C. Thus, reaction product of a grade similar to that in Example 1 was withdrawn at the rate of 1,500 Kg/hr to recover isobutylaldehyde at the rate of 619 Kg/hr.

EXAMPLE 4

The same method was followed employing the same apparauts. Urea in powder form which was preheated to 30°C and about 70% of which had a particle size passing a screen of 42 to 65 mesh, 50% $H_2SO_4$, and propionaldehyde at 30°C were continuously fed to the reactor at the rate of 1,000 Kg/hr, 4.2 Kg/hr and 900 Kg/hr, respectively. The molar ratio of aldehyde to urea was about 0.9. The temperature inside the reactor was held automatically at about 59°C. The reaction mixture was held in the reactor for about 30 minutes while ammonia gas was fed from the alkali inlet pipe at the rate of 1.4 Kg/hr. Thus, reaction product was discharged at the rate of 1,450 Kg/hr. Unreacted propionaldehyde was collected at the rate of 430 Kg/hr.

What is claimed is:

1. In a method of manufacturing an alkylidene diurea product by the reaction of solid urea and an alkyl aldehyde having 3 to 4 carbon atoms in the substantial absence of a solvent for said urea in the presence of a aqueous acid catalyst selected from the group consisting of hydrochloric acid, sulfuric acid, phosphoric acid, acetic acid, formic acid, monochloroacetic acid, oxalic acid, citric acid, tartaric acid, benzene sulfuric acid and toluene sulfonic acid, the improvement which comprises carrying out the reaction with stirring in a non-gas-tight vessel; continuously introducing solid urea into said reaction zone and continuously introducing said aldehyde in liquid form into said reaction zone by spraying in the ratio of 1 mole of urea to 0.6 to 1.1 moles of said aldehyde; maintaining the temperature of the reaction mixture above the boiling temperature of said aldehyde in the reaction zone and up to 20°C higher than the said boiling temperature by an autogenous balance between the heat of reaction and the latent heat of evaporation of by-product water and said aldehyde by permitting said water and unreacted aldehyde to evaporate;

maintaining the pH of reaction product less than 6 by addition of said catalyst to said reaction zone;

continuously discharging the evaporated aldehyde as vapor from said aldehyde vapor outlet; and continuously removing the product from said zone.

2. A method according to claim 1 wherein said aldehyde is isobutyl aldehyde, said temperature is about 63° to 75°C and said urea is preheated to above 30°C.

3. A method according to claim 1 wherein the reactant mixture flows substantially horizontally, the urea is introduced at the entrance end of said zone, the product is removed from the opposite and discharge end of said zone, the aldehyde is introduced to said zone in a plurality of sprays.

4. A method according to claim 3 wherein said vessel has a product outlet and a urea inlet, said aldehyde is sprayed over an area adjacent to said urea inlet, and aldehyde vapor is removed from said zone at an area between said sprays and said outlet.

5. A method according to claim 3 wherein said vapor is freed from water, and the aldehyde is condensed and the condensate is returned to said sprays.

6. A method according to claim 3 wherein alkali is added to said product at said discharge end to neutralize the acidity thereof.

7. A method according to claim 1 wherein a part of said water is separated from said vapor.

8. A method according to claim 1 wherein said evaporated aldehyde is condensed and returned to said reaction vessel.

9. A method according to claim 1 wherein said acid catalyst is added in 30 to 50% aqueous solution.

10. A method according to claim 1 wherein said stirring is carried out by a paddle mixer.

* * * * *